United States Patent [19]

Girola

[11] 4,331,073
[45] May 25, 1982

[54] PRESSURE APPLICATION APPARATUS

[75] Inventor: Umberto Girola, Monza, Italy

[73] Assignee: Firma Theodor Hymmen KG., Bielefeld, Fed. Rep. of Germany

[21] Appl. No.: 188,682

[22] Filed: Sep. 19, 1980

[30] Foreign Application Priority Data

Sep. 20, 1979 [DE] Fed. Rep. of Germany ....... 2937971

[51] Int. Cl.³ ............................................. B30B 5/04
[52] U.S. Cl. .................................. 100/154; 425/371
[58] Field of Search ................... 100/93 RP, 151, 153, 100/154; 162/358; 425/371; 156/555, 583.5

[56] References Cited

U.S. PATENT DOCUMENTS

| | | | |
|---|---|---|---|
| 2,135,763 | 11/1938 | Nicholson | 100/154 X |
| 3,340,795 | 9/1967 | Hartley | 100/154 |
| 3,620,158 | 11/1971 | Torelli | 425/371 X |
| 3,748,225 | 7/1973 | Busker | 100/154 |
| 3,839,147 | 10/1974 | Daane | 100/154 |
| 3,973,893 | 8/1976 | Camp | 100/154 |
| 4,193,342 | 3/1980 | Held | 100/154 |
| 4,253,391 | 3/1981 | Held | 100/154 |

FOREIGN PATENT DOCUMENTS

| | | | |
|---|---|---|---|
| 2105575 | 8/1972 | Fed. Rep. of Germany | 100/154 |
| 2853285 | 6/1979 | Fed. Rep. of Germany | 100/154 |

*Primary Examiner*—Billy J. Wilhite
*Attorney, Agent, or Firm*—Head & Johnson

[57] ABSTRACT

An apparatus for applying a surface pressure to progressively moving workpieces such as chipboard panels or the like comprising at least one rotating pressure application belt having a workpiece-carrying surface and an opposed surface, and apparatus for applying pressure to the belt to cause the belt to apply pressure to the workpiece, such pressure applying apparatus being in the form of a pressure plate parallel to and spaced from the belt, the plate having a groove adjacent its peripheral surface, the groove receiving a sealing member secured to a frame, and a seal between the frame and the groove, the sealing member slidably engaging the belt to form a closed chamber, an opening in the plate to admit a pressurization fluid medium so that pressure within the chamber applies force on the belt to in turn apply force on the moving workpiece.

7 Claims, 4 Drawing Figures

PRESSURE APPLICATION APPARATUS

BACKGROUND OF THE INVENTION

Field of the Invention

The present invention relates to an apparatus for applying a surface pressure to progressively moving workpieces such as chipboard panels. In a known apparatus for applying a surface pressure, there is provided at least one rotating belt adapted to be pressed against the workpiece by a pressure medium. The pressure medium is introduced into a pressure chamber sealed by a sealing member adjacent to the belt. The sealing member is guided by a frame or holder in a groove formed in a pressure plate. The belt is in sliding engagement with, and slides along, the sealing member.

In such a known apparatus, the width of the frame or holder has hitherto been selected so as to be as large as the width of the groove, so that the frame fits into the groove. The frame is inserted into the groove in the absence of pressure and is pressed out therefrom by means of the pressure medium introduced into the interior of the groove. Whilst the pressure medium for example, compressed air, urges the frame, and the sealing member associated therewith, in a vertical direction towards the surface of the belt, the compressed air contained in the pressure chamber acts against the lateral surface of the belt and produces a force directed parallel to the surface of the belt. This force produces a moment acting on the frame or holder causing tilting of the frame within the groove. If the frame is tilted, it therefore cannot be displaced relative to the pressure plate by means of the compressed air. A result of such effect is that if the belt deviates from the plane of its direction of travel during the pressing operation, the sealing member cannot follow these deviations so that a gap appears between the belt and the sealing member. The compressed air may be discharged from the pressure chamber through this gap and the sealing member cannot, therefore, fulfil its object.

The present invention seeks to provide an apparatus of the general type described above but which ensures, in use, constant abutment of the sealing member against the pressure application belt sliding therealong but which permits unobstructed movement of the sealing member and the frame associated therewith in a direction at right angles to the plane of movement of the belt if the band deviates from its plane of movement.

In accordance with the present invention, there is provided an apparatus for applying a surface pressure to progressively moving workpieces such as chipboard panels comprising at least one rotating pressure application belt having a workpiece-carrying surface and an opposed surface and means for applying pressure to said belt to cause said belt to apply pressure to said workpiece said pressure application means comprising a sealing strip in sealing abutment with said opposed surface of said belt, said sealing strip together with said belt forming part of a pressure chamber into which a pressure medium is induced, guide means for guiding said sealing member, said guide means comprising a pressure plate, said pressure plate having a recessed wall portion formed therein to define a groove, said groove receiving a frame member, said frame member guiding said sealing member, the improvement comprising dimensioning said frame to be smaller than said groove such that a spacing is maintained therebetween, a resilient sealing member spanning said spacing, said resilient sealing member having a first end and a second end, said first end portion connecting said resilient sealing member to said frame and said second end portion slidingly abutting said recessed wall portion defining said groove.

Preferably, said frame has an end portion facing said pressure belt, said apparatus additionally comprising a plurality of retaining yokes, said yokes projecting into the region of said groove and laterally supporting said end portion of said frame.

BRIEF DESCRIPTION OF THE DRAWINGS

The invention will be further described, by way of example, with reference to the accompanying drawings, in which.

Figure 4:
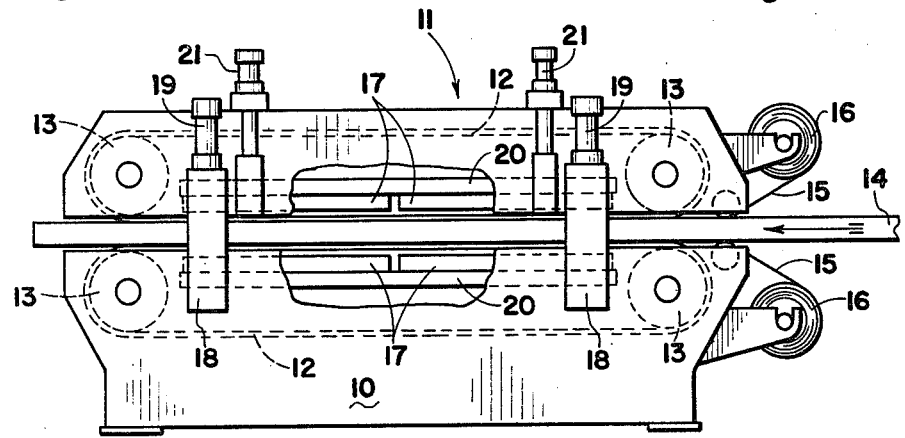
FIG. 4 is a side view of an apparatus in accordance with the present invention which has an upper and a lower pressure application belt.

An apparatus in accordance with the present invention comprises a lower frame 10 and an upper frame 11, best seen in FIG. 4, in which endless pressure application belts 12 are incorporated. The belts 12 pass over guide rollers 13 and are driven thereby. The frames are so arranged that a gap is defined between the adjacent opposing faces of the two belts. The size of the gap is selected in dependence upon the relevant dimension of a workpiece 14 to be treated. Although the surfaces of the belts making contact with the workpiece 14 are moving horizontally, the workpieces 14 are drawn into the apparatus and, in the gap defined between the surfaces of the belts, are subjected to a pressure by the surfaces of the pressing belts 12 when passing through the device. A treated workpiece is discharged at the outlet of the apparatus (not shown).

In the present embodiment, it will be assumed that a foil or sheet 15 is to be applied to each of the upper and lower surfaces of the workpiece 14. The foil is unwound from storage rolls 16. Such a pressing operation may be effected at room temperature but, if desired, heating means (not shown) may be provided for producing high temperatures of the workpiece 14 in the treatment region. To produce the required pressure, the upper frame 11, as a whole, could be pressed against the lower frame 10. However, according to the present invention, the spacing between the upper frame 11 and the lower frame 10 is set approximately and the necessary pressure is applied by means of compressed air. The compressed air is located in pressure chambers 17 which are arranged on the rear (with reference to the workpiece 14) surface of the belt 12, that is to say, the surface of the belt 12 which is not in contact with the workpiece 14.

For approximately setting the spacing between the frames 10 and 11, guide slides 18 are provided which are secured to the lower frame 10 and on which the upper frame 11 is vertically displaceable. To effect such displacement, hydraulic cylinders 19 are provided.

The pressure chambers 17 are partially defined by plates 20 which are displaceably guided relative to the frames 10 and 11, the displacement thereof being effected by means of hydraulic cylinders 21. The surface of the pressure plate 20 facing the pressure application belt 12 has an annular groove 22 formed therein in which a sealing member 23 is fixedly mounted. In use, this sealing member 23 abuts against the belt 12, the belt sliding past the sealing member. Each pressure chamber 17 is thus defined by the surface of the pressure plate 20, the surface of the belt 12 remote from the workpiece 14 and the circular sealing member 23. A pressure medium may be introduced into the pressure chamber 17 through apertures 24 formed in the pressure plate 20. The pressure plate 20 is rotatable about a central axis 25 extending at right angles to the belt 12. Accordingly, if the plate 20 is rectangular having sides of differing lengths, rotation of the plate permits the width of the pressure chamber to be adjusted to deal with workpieces of different widths.

Figure 1:
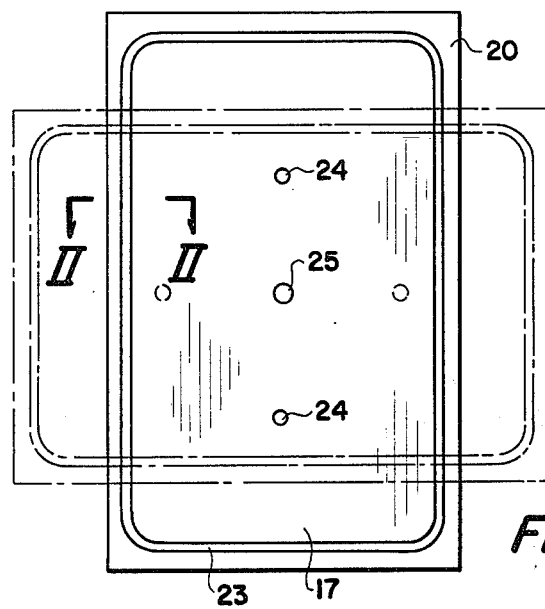
FIG. 1 is a view of part of an apparatus in accordance with the present invention comprising a pressure plate which is rotatable about a central axis, the plate being viewed from the direction of a pressure application belt also forming part of the apparatus.
Figure 2:
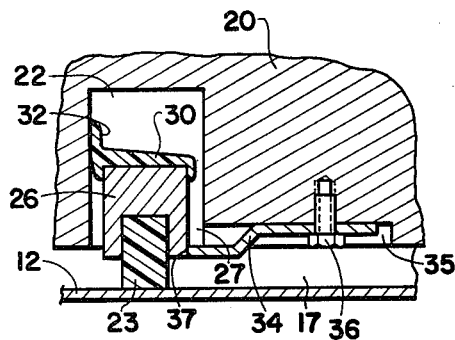
FIG. 2 is a sectional view taken along the line II—II of FIG. 1 showing a first embodiment of a frame carrying a sealing member which is in sealing contact with the belt and also shows a further resilient sealing member.
Figure 3:
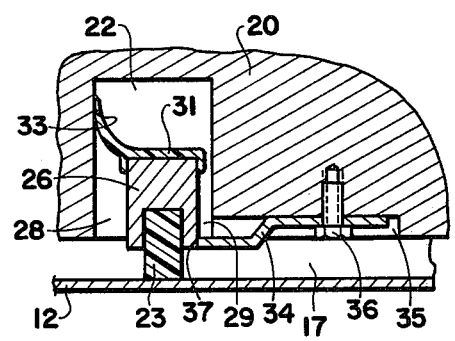
FIG. 3 is a sectional view similar to FIG. 2 of a second embodiment of a frame.

The sealing member 23 is retained in the groove 22 by means of a frame member 26. The frame member also has an annular groove formed therein which is open towards the belt 12 in which the sealing member 23, which is of rectangular cross-section, is inserted. The frame 26 is displaceable vertically within the groove 22 with respect to the belt 12, but the sealing member 23 is fixedly retained within the frame 26. The width of the frame 26 is smaller than the width of the groove 22, so that a gap 27 exists between the walls of the groove 22 and the frame 26. In the embodiment shown in FIG. 2 of the drawings the frame 26 is centrally disposed within the groove 22 so that the gaps on either side of the frame are of equal size. In FIG. 3, the frame is eccentrically disposed so that the gaps 28 and 29 are of different sizes. The bottom surface of the frame 26, that is to say the surface parallel to the belt 12 but remote therefrom has a resilient rubber sealing member 30 or 31 arranged thereon, one edge 32 or 33 of which abuts against a wall of the groove so as to seal off the interior of the groove 22 relative to the atmosphere. The edge 33 shown in FIG. 3 is longer than the edge 32 shown in FIG. 2. The sealing member 31, because it can be resiliently deformed, may therefore compensate for greater deflections of the frame 26 than the member 30. During deflecting movements of the frame 26, the edge 32 or 33 remains in abutment with the wall of the groove 22 so that no sliding friction occurs.

The end region of the frame 26 facing the belt 12 is laterally supported by a plurality of retaining yokes 34, which project into the region of the groove 22 by an amount corresponding to the size of the gap 27 or 29. One end of each retaining yoke 34 is secured to pressure plate 20 within a recess 35 formed in the plate, such as by means of a bolt 36. A spacing is maintained between each two successive retaining yokes 34 which permits pressure medium from the pressure chamber 17 to flow through the space 27 or 29 into the interior of the groove 22. The pressure medium which may, for example, be compressed air, reaches the pressure chamber 17 through the apertures 24 and so builds up a uniform static pressure in the pressure chamber 17 and in the portion of the groove 22 not occupied by the frame 26. This pressure produces a force which presses the sealing member 23 vertically onto the belt 12. This force counteracts a smaller force which is determined by the pressure of the pressure medium in the pressure chamber 17 and the portion 37 of the surface of the frame 26 which faces the belt 12 and lies within the pressure chamber 17. Thus, it suffices for the pressure of the pressure medium in the chamber 17 to be only slightly above atmospheric pressure for a resultant force to be produced which presses the sealing member 23 against the belt 12.

In use, the frame 26, together with the sealing member 23, is constantly pressed in a direction towards the belt 12 due to the excess pressure prevailing in the pressure chamber 17 and the groove 22. Deflections from the plane of the direction of travel of the belt are readily followed by the sealing member 23 and the frame 26 associated therewith because the frictional resistance between the frame 26 and the pressure plate 20 is very low. No friction occurs between the surface of the frame 26 and the walls of the groove 22. The only point at which a slight frictional force may be set up is at the point of contact between the retaining yoke and the frame 26. The frame may also be slightly pivoted about this point of contact, so that tilting in the groove 22 is not possible.

We claim:

1. In an apparatus for applying a surface pressure to progressively moving workpieces such as chipboard panels, or the like, having at least one rotating pressure application belt having a workpiece-carrying surface and an opposed surface and means for applying pressure to said belt to cause said belt to apply pressure to said workpiece, said pressure application means having a sealing strip in sealing abutment with said opposed surface of said belt, said sealing strip together with said belt forming part of a pressure chamber into which a pressure medium is induced, guide means for guiding said sealing strip, said guide means comprising a pressure plate, said pressure plate having a recess therein, the recess having walls defining a groove, a frame member received in said groove, said frame member guiding said sealing strip, the improvement comprising dimensioning said frame member to be smaller in width than the width of said groove such that spacing is maintained between the frame member and the groove, a resilient sealing member having a first end and a second end, the first end being connected to said frame member and said second end slidingly abutting a said wall of said recess.

2. An apparatus as recited in claim 1, wherein said frame member has an end portion facing said pressure belt, said apparatus additionally comprising a plurality of retaining yokes, said yokes projecting into the region of said groove and laterally supporting said frame member.

3. An apparatus as recited in claim 2, wherein each said retaining yoke is connected to said pressure plate within said pressure chamber.

4. An apparatus as recited in claim 2, wherein each said retaining yoke is connected to said pressure plate within said pressure chamber, said pressure plate having a yoke receiving recesses formed therein, said connection of each said yoke to said plate being effected by bolt means, said bolt means engaging said plate in said yoke receiving recess.

5. An apparatus as recited in claim 2, wherein each two adjacent retaining yokes defines a passage aperture therebetween, said aperture opening into the interior of said groove and acting as a conduit for said pressure medium.

6. An apparatus as recited in claim 1, wherein said frame member has an end face remote from said pressure belt, said resilient sealing member being affixed to said end face.

7. An apparatus as recited in claim 1, wherein said frame member has an end face facing said pressure belt, said sealing strip being affixed to such frame member and face.

* * * * *